(12) United States Patent
Yu et al.

(10) Patent No.: US 7,515,641 B2
(45) Date of Patent: Apr. 7, 2009

(54) APPARATUS AND METHOD FOR PROCESSING RANGING CHANNEL IN ORTHOGONAL FREQUENCY DIVISION MULTIPLE ACCESS SYSTEM

(75) Inventors: Chang-Wahn Yu, Daejeon (KR);
Kyung-Yeol Sohn, Daejeon (KR);
Youn-Ok Park, Daejeon (KR);
Seung-Ku Hwang, Seoul (KR)

(73) Assignees: Electronics and Telecommunications Research Institute (KR); Samsung Electronics Co., Ltd. (KR); SK Telecom Co., Ltd. (KR); KT Corporation (KR); KTFreetel Co., Ltd. (KR); Hanaro Telecom, Inc. (KR)

( * ) Notice: Subject to any disclaimer, the term of this patent is extended or adjusted under 35 U.S.C. 154(b) by 751 days.

(21) Appl. No.: 10/923,136

(22) Filed: Aug. 19, 2004

(65) Prior Publication Data

US 2005/0135230 A1    Jun. 23, 2005

(30) Foreign Application Priority Data

Dec. 22, 2003    (KR) ............... 10-2003-0094825

(51) Int. Cl.
*H04K 1/10*    (2006.01)
(52) U.S. Cl. .................. 375/260; 375/222; 375/229; 375/234; 375/277; 375/232
(58) Field of Classification Search ............ 375/260, 375/222, 229, 232; 455/234, 277
See application file for complete search history.

(56) References Cited

U.S. PATENT DOCUMENTS

| 5,852,630 | A  | * | 12/1998 | Langberg et al. | ............ 375/219 |
| 6,944,119 | B1 | * | 9/2005 | Sudo et al. | ................... 370/208 |
| 2003/0063558 | A1 | * | 4/2003 | Kim | ........................ 370/208 |
| 2004/0086027 | A1 | * | 5/2004 | Shattil | ........................ 375/146 |

FOREIGN PATENT DOCUMENTS

KR    200110082061    8/2001

OTHER PUBLICATIONS

Wahlqvist, M., et al., "Time synchronization in the uplink of an OFDM system", Vehicular Tech. Conf., IEEE 46th, vol. 3, Apr. 28, 1996-May 1, 1996, pp. 1569-1573.

* cited by examiner

*Primary Examiner*—Shuwang Liu
*Assistant Examiner*—Kabir A Timory
(74) *Attorney, Agent, or Firm*—Blakely, Sokoloff, Taylor & Zafman LLP

(57) ABSTRACT

Disclosed is an apparatus and method for processing a ranging channel in an OFDMA system. The apparatus converts received ranging complex signals to polar coordinate signals having a signal magnitude and a phase, and the received converted signals are each represented by a signal magnitude component and a phase component. A predetermined phase component of a signal according to a phase rotation is used to estimate a time delay by an addition operation of the phase of the received signal and the phase according to the phase rotation. Accordingly, the time delay and the power of each reverse link user of the OFDMA mobile communication system can be calculated by arithmetic operations of addition components instead of multiplication components, resulting in the reduction of complexity.

2 Claims, 3 Drawing Sheets

APPARATUS AND METHOD FOR PROCESSING RANGING CHANNEL IN ORTHOGONAL FREQUENCY DIVISION MULTIPLE ACCESS SYSTEM

CROSS REFERENCE TO RELATED APPLICATION

This application claims priority to and the benefit of Korea Patent Application No. 2003-94825 filed on Dec. 22, 2003 in the Korean Intellectual Property Office, the entire content of which is incorporated herein by reference.

BACKGROUND OF THE INVENTION (a) Field of the Invention

The present invention relates to an apparatus and method for processing ranging channels in an orthogonal frequency division multiple access (OFDMA) system. More specifically, the present invention relates to an apparatus and method for processing ranging channels to measure the propagation delay and the power of each mobile station on the reverse link of an OFDMA system.

(b) Description of the Related Art

For realization of a wireless wideband multimedia system that provides large-capacity services with high reliability, the OFDM system has been spotlighted in that it can transmit signals at a high transmission rate through time division multiple access (TDMA) wireless channels in a millimeter wave band of several to several tens of GHz.

The OFDM system enhances the frequency use efficiency by using subcarriers having mutual orthogonality, and overcomes the characteristic of signals for multi-path channels with a one-tap equalizer because the period of data signals changes slowly in that system. OFDM, in which the digital signal processing part is realized rapidly by fast Fourier transform (FFT), is also widely used for high-speed communication systems. This system is used, for example, in wireless communication systems such as digital audio broadcasting (DAB), digital video broadcasting (DVB), IEEE 802.11a, HIPERLAN/2, and so forth.

The orthogonal frequency division multiple access (OFDMA) system, which is a multiple access system designed for simultaneous access of multiple users, is applied to OFDM. OFDMA divides an allocated frequency band into N subcarriers and allocates the subcarriers into groups for simultaneous use by multiple links.

On the forward link from a base station to a plurality of mobile stations, the subcarrier groups allocated to the respective mobile stations are transferred simultaneously while they are in time synchronization with one another, thereby guaranteeing mutual orthogonality of the subcarriers. On the reverse link from a plurality of mobile stations to the base station, however, signals randomly transferred from the multiple mobile stations arrive at the base station with different time delays and different power, and a loss of signal orthogonality occurs when the time delays and the power exceed a protection interval and a power level allowed to the base station, thus causing a serious loss of signals.

In an attempt to control the time delays and power properties of the random signals of the mobile stations, the OFDMA system may employ a ranging system that allocates a subcarrier group to a defined ranging channel and controls the base station to measure propagation delay and power using the ranging channel received from each mobile station.

The mobile station transmitter and the base station receiver using the conventional ranging system are described as follows. For initial connection and data transmission, the mobile stations randomly select signals of a predetermined pseudo noise code and convert them using a subcarrier group allocated to the ranging channel. The ranging channel is converted to a time-domain signal through inverse fast Fourier transform (IFFT). For protection from inter-symbol interference (ISI), the time-domain signal is combined with a cyclic prefix (CP) into a baseband signal. The baseband signal thus generated is transmitted on a wireless channel by RF signal processing and sent to the base station receiver.

Upon receiving signals with different delays from the mobile stations simultaneously, the base station receives baseband signals by RF signal processing and converts them to frequency-domain signals by fast Fourier transform (FFT). The ranging channel is selected from the frequency-domain signals to measure the correlations of all the pseudo noise codes and time delays.

In the description of the ranging channel processing procedure, it is assumed that S time delays are predetermined in the system. Each of the received ranging complex signals R(k) having P lengths is multiplied by a phase rotation component $\exp(-j2\pi k n_0/N)$ corresponding to a specific delay n0 to eliminate the phase component from the signal for the specific time delay. Each of the signals removed of the phase component is correlated with a set of Q ranging codes. The correlation value thus determined is compared with a threshold, and the power is calculated when the correlation value is greater than the threshold. The correlation with a set of Q ranging codes is similar to general CDMA pseudo noise code demodulation, and includes a multiplication of the corresponding code by the received signals to calculate the sum of the signals. In this way, S arithmetic operations of as many as the number of time delays are performed. When the signal is greater than the threshold, the corresponding delay and the code and power are reported to the upper system.

The propagation delay of each mobile station to be measured by the base station is proportional to the round-trip propagation delay between the base station and the mobile station and the RF processing delay, and the number of time delays to be measured increases with an increase in the distance between the base station and the mobile station. In the case of using complex coordinates, the complexity for a specific time delay is given by the multiplication of the received complex signal by the phase rotation complex signal, and P×Q×4 multiplications and P×Q×2 additions are needed. Accordingly, in the receiver structure of the ranging method, the complexity of H/W increases with an increase in the number of pseudo noise codes or the timing for the time delay to be measured, so it takes an excessive amount of time to measure the propagation delay time and the power of the mobile stations with a corresponding deterioration of efficiency.

SUMMARY OF THE INVENTION

It is an advantage of the present invention to provide an apparatus and method for processing a ranging channel in an OFDMA system, which method includes, upon receiving signals of different propagation delays and different power from a plurality of mobile stations, the base station calculating the magnitude and phase components of each signal using polar coordinates and performing an addition operation of the phase value of the received signal and the phase value according to a phase rotation of the signal by using a phase component of the phase-rotated signal as predetermined prior to the reception of the signal, thereby efficiently and rapidly measuring the propagation delay time and the power of each mobile station.

The present invention is directed to a ranging channel processing apparatus for measuring a time delay and a power of each baseband signal received by a base station of an orthogonal frequency division multiple access system.

In one aspect of the present invention, there is provided an apparatus for processing a ranging channel in an orthogonal frequency division multiple access system that includes: a ranging channel signal extractor for selecting a subcarrier allocated to the ranging channel among frequency-domain signals converted from the baseband signals by fast Fourier transform (FFT); and a ranging channel processor for performing an addition operation of a phase value of a received ranging complex signal selected by the ranging channel signal extractor and a phase value corresponding to a phase rotation of the signal to measure a time delay and a corresponding power.

The ranging channel processor includes: a polar coordinate converter for converting the received ranging complex signal to a polar coordinate signal; a time delay phase generator for generating a phase component for the time delay of the complex signal; a time correlator for estimating the time delay of the ranging channel based on output signals of the polar coordinate converter and the time delay phase generator; a pseudo noise code correlator for discriminating a predetermined pseudo noise code for the ranging channel based on an output signal of the time correlator, and eliminating the signal of the pseudo noise code; a complex coordinate converter for converting the polar coordinate signal to a complex signal; an integrator for measuring the magnitude and power of a signal transferred on the ranging channel; and a comparator for comparing the signal magnitude and the power with a predetermined threshold of a receiver. The apparatus measures the time delay and the corresponding code and power based on an output of the comparator. Here, the phase value according to the phase rotation of the complex signal is predefined by the following equation:

$$Y(k) = X(k)\exp\left(-\frac{2\pi k n_0}{N}\right)$$

where k is the index of the subcarrier; and N is the number of FFT points.

The time correlator performs an addition operation of a phase value of the polar coordinate signal and a phase value according to a phase rotation of the complex signal, so as to estimate the time delay of the ranging channel.

The present invention is also directed to a ranging channel processing method for measuring a time delay and power of each baseband signal received by a base station of an orthogonal frequency division multiple access system.

In another aspect of the present invention, there is provided a method for processing a ranging channel in an orthogonal frequency division multiple access system that includes: (a) receiving a complex signal of a subcarrier allocated to the ranging channel among frequency-domain signals converted from the baseband signals by fast Fourier transform (FFT); (b) converting the complex signal to a polar coordinate signal, and performing an addition operation of a phase value of the received signal and a phase value corresponding to a phase rotation of the complex signal to measure a time delay of a mobile station; (c) performing a correlation between each output signal of the step (b) and a ranging code set; (d) comparing the correlation of the step (c) with a threshold; and (e) measuring a power of the corresponding signal when the correlation is greater than the threshold.

The step (c) includes: (i) eliminating a pseudo noise code selected by the mobile station from the output signal of the step (b); (ii) converting the polar coordinate signal removed of the pseudo noise code to a complex signal; and (iii) integrating the complex signal of the step (ii) to measure a magnitude of the signal.

The present invention is further directed to a recording medium storing a program for realizing the ranging channel processing method that is for measuring a time delay and power of each baseband signal received by a base station in an orthogonal frequency division multiple access system.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

First, a receiver for processing a ranging channel in an OFDMA system is described below with reference to FIG. 1.

Figure 1:
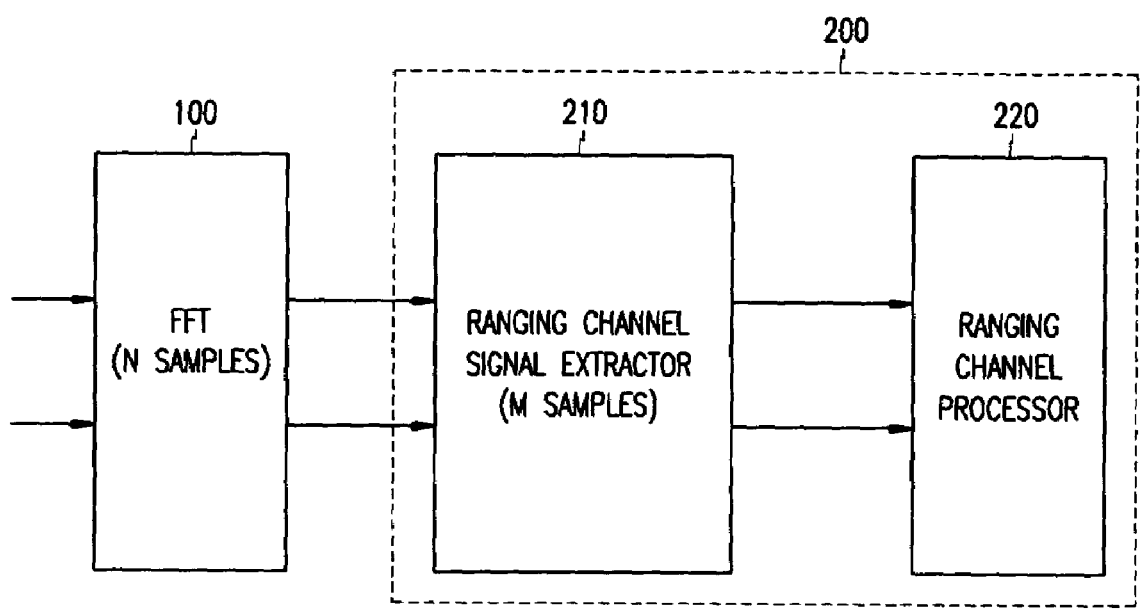
FIG. 1 is a schematic of a receiver for processing a ranging channel in an OFDMA system according to an embodiment of the present invention.

FIG. 1 is a schematic of a receiver for processing a ranging channel in an OFDMA system according to an embodiment of the present invention.

The base station receiver for processing a ranging channel in an OFDMA system according to an embodiment of the present invention comprises, as shown in FIG. 1, an FFT section 100 and a ranging channel processor 200. In the figure, two signal lines connecting the respective component parts denote complex signals.

The FFT section 100 converts the ranging channel, which is a time-domain signal converted by IFFT at a mobile station transmitter, into a frequency-domain signal. The channel is generally comprised of sub-channels consisting of a plurality of subcarriers, and a group of at least two adjacent sub-channels is used as a ranging channel. Hence, a ranging channel signal must be extracted from the channel signals output from the FFT section 100.

The ranging channel processor 200 comprises a ranging channel signal extractor 210 and a ranging channel processor 220. The ranging channel signal extractor 210 selects M complex signals of the subcarrier group used for the ranging channel from N frequency-domain complex signals of the FFT section 100, while the ranging channel processor 220 measures the time delay and the power of each mobile station by using the selected M complex signals of the ranging channel signal extractor 210.

The ranging channel processing apparatus and its operation are described in detail with reference to FIGS. 2 and 3, respectively.

First, the ranging channel processor according to an embodiment of the present invention is described in detail with reference to FIG. 2.

Figure 2:
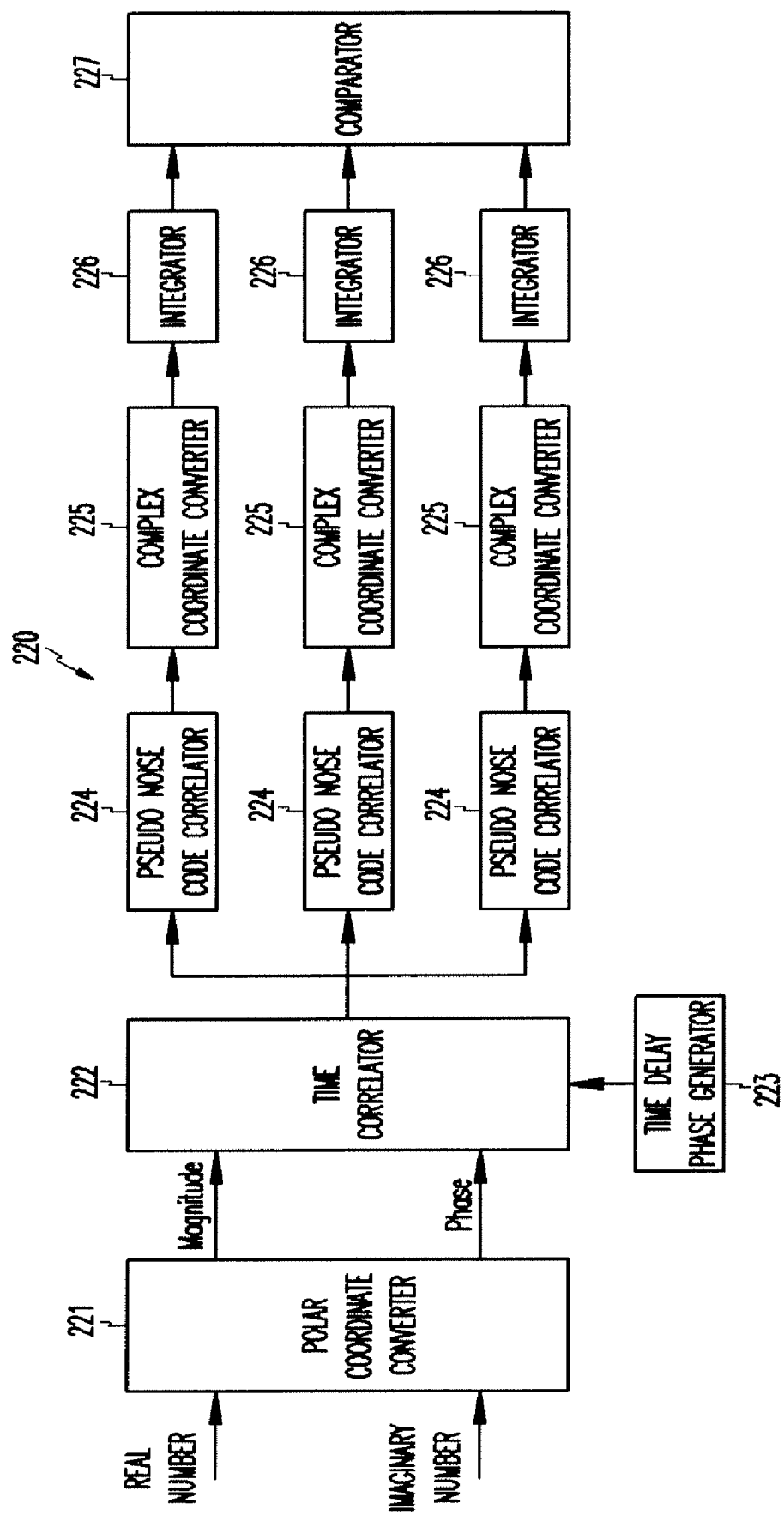
FIG. 2 is a diagram showing the detailed structure of the ranging channel processor shown in FIG. 1.

FIG. 2 is a detailed schematic of the ranging channel processor according to the embodiment of the present invention.

The ranging channel processor 220 comprises, as shown in FIG. 2, a polar coordinate converter 221, a time correlator 222, a time delay phase generator 223, a pseudo noise code correlator 224, a complex coordinate converter 225, an integrator 226, and a comparator 227.

The polar coordinate converter 221 converts M complex signals of the ranging channel to M polar coordinate signals, each having a signal magnitude and a phase.

The time delay phase generator 223 generates a phase for the time delay of the M complex signals of the ranging channel.

The time correlator 222 performs an addition operation of the magnitude and phase value of the signal from the polar coordinate converter 221 and the phase value of the time delay phase generator 223, to estimate the propagation delay of the ranging channel.

The pseudo noise code correlator 224 includes pseudo noise code correlators of as many as the number of pseudo noise codes available to the mobile station, and eliminates the respective pseudo noise codes concerned.

The complex coordinate converter 225 converts the polar coordinate signals to complex signals.

The integrator 226 measures the magnitude and the power of the signal of the ranging channel from the complex signal of the complex coordinate converter 225.

The comparator 227 compares the outputs of the integrator 226 with a predetermined threshold, and measures a corresponding delay and its corresponding code and power when the signal is greater than the threshold.

In this way, the apparatus for processing a ranging channel according to the embodiment of the present invention enables each mobile station to process the ranging channel of the received signal from the base station on the reverse link, and to measure the time delay and the power of the received signal.

Next, the operation of the ranging channel processing apparatus according to the embodiment of the present invention is described in detail with reference to FIG. 3.

The ranging channel is processed so as to measure the time delay and the power of random mobile stations. The procedures for processing the ranging channel are described as follows. Here, it is assumed that the base station and the mobile station are aware of a set of Q ranging codes each having P lengths as generated from a defined PN generator.

First, the transmission procedures of one mobile station to acquire initial synchronization are described, as follows. The mobile station transmitter randomly selects one of the Q ranging codes and allocates it to P subcarriers allocated to the ranging channel among the OFDMA subcarrier groups. The frequency-domain ranging signal is converted to a time-domain signal by IFFT and sent to the base station through the RF end. The initial ranging signal transmission time of each mobile station is randomly selected, and the base station can measure the relative propagation delay of each mobile station using a base station reference time. In the measurement of the randomly selected transmission time of each mobile station, with the frequency-domain signal X(k) corresponding to the time-domain signal x(n), the frequency-domain signal Y(k) corresponding to the time-domain signal x(n-n0) having a delay n0 is given by:

$$Y(k) = X(k)\exp\left(-\frac{2\pi k n_0}{N}\right) \qquad \text{Equation 1}$$

where k is the index of the subcarrier; and N is the number of FFT points.

As can be seen from Equation 1, the delay of the time-domain signal is represented by a phase rotation in the frequency domain, which characteristic is used to estimate the propagation delay of each mobile station in the frequency domain.

The procedures for the base station processing the sum of signals randomly received from the mobile stations are as follows. The FFT section 100 converts the time-domain signals to frequency-domain signals by FFT, and the ranging channel signal extractor 210 selects subcarriers allocated to the ranging channel and sends them to the ranging channel processor 220.

To measure the available propagation delay and the corresponding code and power of each mobile station, the ranging channel processor 220 must calculate the correlation between the number of time delays as defined in the system and all the codes concerned.

The ranging channel processing method of the present invention is described below with reference to FIG. 3.

Figure 3:
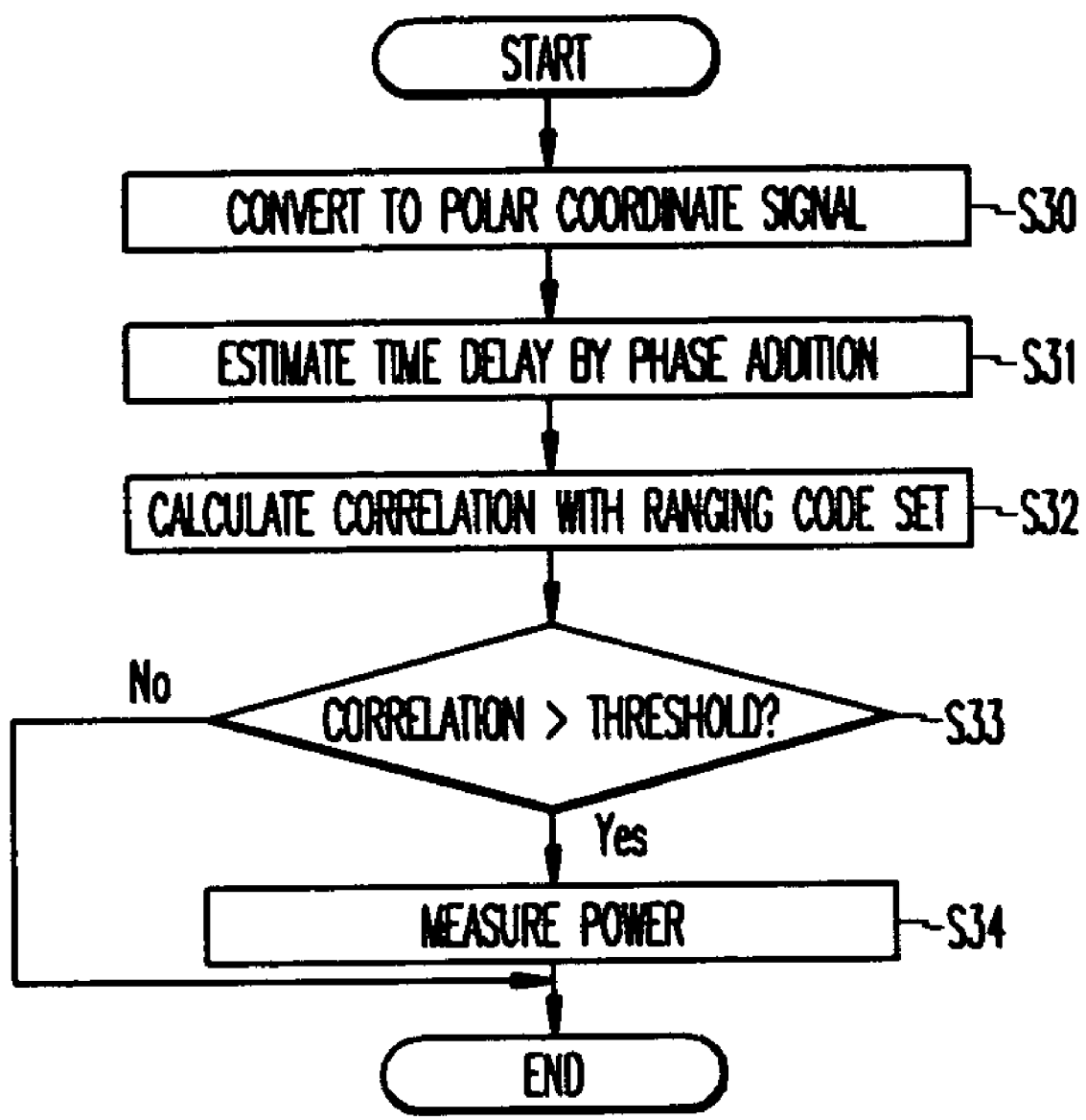
FIG. 3 is a flow chart showing the operation of the ranging channel processor according to an embodiment of the present invention.

FIG. 3 is a flow chart showing the ranging channel processing method according to an embodiment of the present invention.

The propagation delay of each mobile station to be measured by the base station is proportional to the round-trip propagation delay between the base station and the mobile station and the RF processing delay. Expediently, it is assumed that the number of time delays defined in the system is S. The operation for measuring one of the S time delays to be measured by the ranging channel processor 220 is described as follows.

The polar coordinate converter 221 converts M ranging complex signals R(k), comprised of real and imaginary numbers and that are received from the ranging channel signal extractor 210, into M polar coordinate signals having a signal magnitude and a phase so as to measure the pseudo noise code and the corresponding power, in step S30. The time correlator 222 for estimating the propagation delay performs addition operations of the M signals from the polar coordinate converter 221 and the output value of the time delay phase generator 223 for generating a phase component for the time delay, so as to estimate the time delay of each mobile station, in step S31.

The time correlator 222 performs M addition operations instead of M complex multiplications, since the polar coordinate converter 221 converts the complex signals to the polar coordinate signals. Therefore, an efficient parallel structure can be realized as the detection time of the ranging signal is relatively significant.

Subsequently, each mobile station discriminates the selected pseudo noise codes according to the time-correlated signal by way of the pseudo noise code correlators 224 of which there are as many as the number of pseudo noise codes. The complex coordinate converter 225 converts the polar coordinate signal to a complex signal so as to measure the power and the phase delay of the signal, the integrator 226 calculates the magnitude of the complex signals from the complex coordinate converter 225, and the signals removed of the phase component are correlated with a set of Q ranging codes, in step S32.

Then, the comparator 227 compares the correlation of the ranging code set with a threshold, in step S33. When the correlation is greater than the threshold, the corresponding delay and the code and power are reported to the upper system, in step S34.

The procedures after the operations of the time correlator 222 of FIG. 2 are then repeatedly performed to measure the pseudo noise code of the next time delay and the corresponding power up to a maximum of S time delays.

Therefore, up to S time delays for the ranging channel processing and the corresponding power can be calculated by operations of addition components instead of multiplication components.

The aforementioned ranging channel processing method according to the embodiment of the present invention can be stored in a recording medium (e.g., CD-ROM, RAM, ROM, floppy disk, hard disk, magneto-optical disc, etc.) with an appropriate program.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, it is possible to efficiently and rapidly measure the time delay and the power of each forward link of users in the OFDMA mobile communication system.

Furthermore, upon receiving signals of different time delays and different power from mobile stations, the base station converts the complex multiplication component of each signal to the addition component through the polar coordinate converter, so the present invention can be efficiently applied to the parallel structure of the processing apparatus.

What is claimed is:

1. An apparatus for processing a ranging channel in an orthogonal frequency division multiple access system, which is for measuring a time delay and power of each baseband signal received by a base station of the orthogonal frequency division multiple access system, the apparatus comprising:
   a ranging channel signal extractor for selecting a subcarrier allocated to the ranging channel among frequency-domain signals converted from the baseband signals by fast Fourier transform (FFT); and
   a ranging channel processor to measure a time delay by performing an addition operation of a first phase value of a received ranging complex signal selected by the ranging channel signal extractor and a second phase value corresponding to a phase rotation of the ranging complex signal, the ranging channel processor further to measure a corresponding power of the ranging complex signal by integrating a correlation between the ranging complex signal and a ranging code set, wherein the ranging channel processing comprises:
   a polar coordinate converter for converting the received ranging complex signal to a polar coordinate signal;
   a time delay phase generator for generating a phase component for the time delay of the ranging complex signal;
   a time correlator for estimating the time delay of the ranging channel based on output signals of the polar coordinate converter and the time delay phase generator;
   a pseudo noise code correlator for discriminating a predetermined pseudo noise code for the ranging channel based on an output signal of the time correlator, and eliminating the ranging complex signal of the pseudo noise code;
   a complex coordinate converter for converting the polar coordinate signal to a converted complex signal;
   an integrator for measuring the magnitude and power of a signal transferred from the ranging channel; and
   a comparator for comparing the signal magnitude and the power with a predetermined threshold of a receiver, the apparatus measuring the time delay and the corresponding code and power based on an output of the comparator.

2. An apparatus for processing a ranging channel in an orthogonal frequency division multiple access system, which is for measuring a time delay and power of each baseband signal received by a base station of the orthogonal frequency division multiple access system, the apparatus comprising:
   a ranging channel signal extractor for selecting a subcarrier allocated to the ranging channel among frequency-domain signals converted from the baseband signals by fast Fourier transform (FFT); and
   a ranging channel processor to measure a time delay by performing an addition operation of a first phase value of a received ranging complex signal selected by the ranging channel signal extractor and a second phase value corresponding to a phase rotation of the ranging complex signal, the ranging channel processor further to measure a corresponding power of the ranging complex signal by integrating a correlation between the ranging complex signal and a ranging code set,
   wherein the ranging channel processing comprises:
   a polar coordinate converter for converting the received ranging complex signal to a polar coordinate signal;
   a time delay phase generator for generating a phase component for the time delay of the ranging complex signal;
   a time correlator for estimating the time delay of the ranging channel based on output signals of the polar coordinate converter and the time delay phase generator;
   a pseudo noise code correlator for discriminating a predetermined pseudo noise code for the ranging channel based on an output signal of the time correlator, and eliminating the ranging complex signal of the pseudo noise code;
   a complex coordinate converter for converting the polar coordinate signal to a converted complex signal;
   an integrator for measuring the magnitude and power of a signal transferred from the ranging channel; and
   a comparator for comparing the signal magnitude and the power with a predetermined threshold of a receiver, the apparatus measuring the time delay and the corresponding code and power based on an output of the comparator,
   wherein the time correlator performs an addition operation of the first phase value of the polar coordinate signal and the second phase value according to a phase rotation of the ranging complex signal, so as to estimate the time delay of the ranging channel.

* * * * *